United States Patent Office 3,704,093
Patented Nov. 28, 1972

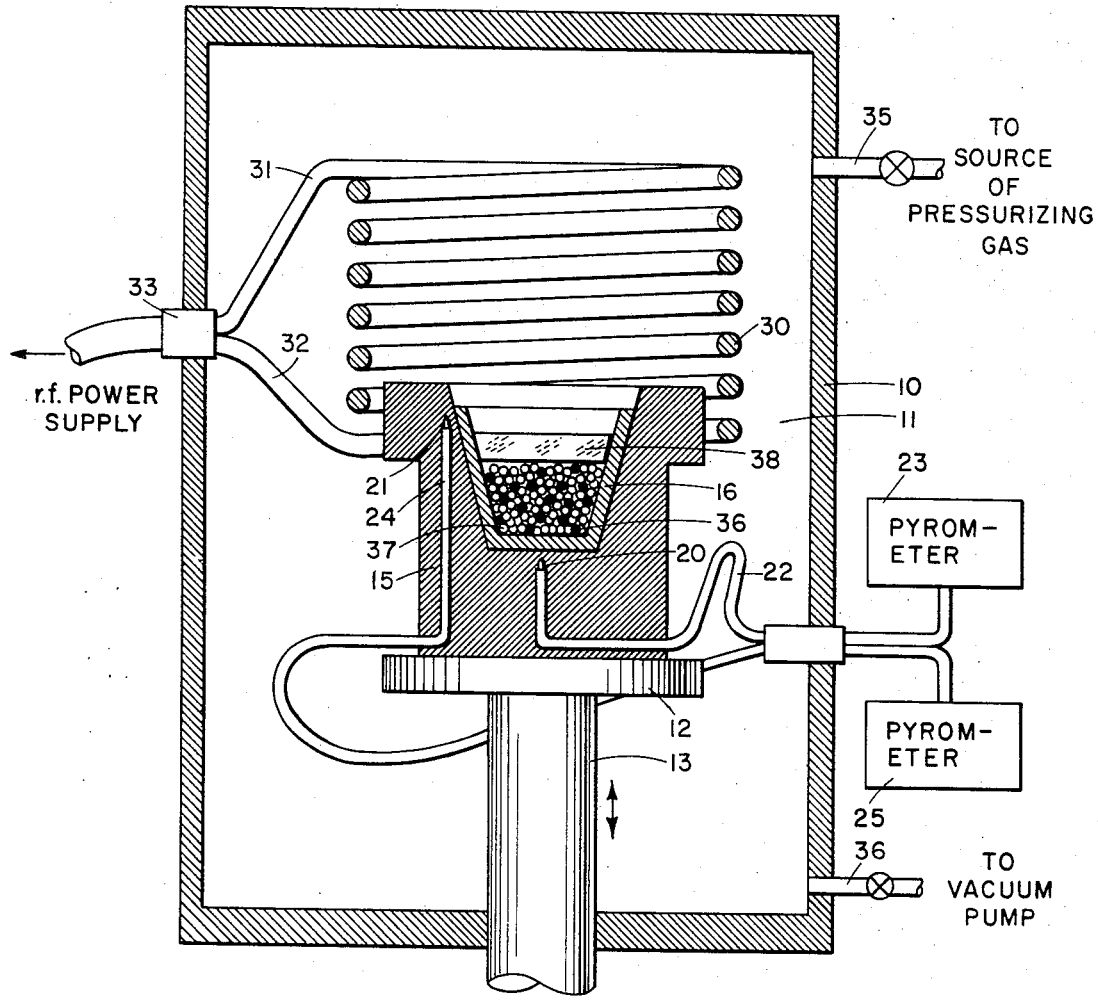

3,704,093
METHOD OF SYNTHESIZING INTERMETALLIC COMPOUNDS
John S. Haggerty, Lincoln, and Joseph F. Wenckus, Needham, Mass., assignors to Arthur D. Little, Inc., Cambridge, Mass.
Filed June 15, 1970, Ser. No. 46,242
Int. Cl. C01g 15/00; C01b 17/00
U.S. Cl. 423—299
15 Claims

ABSTRACT OF THE DISCLOSURE

Method of forming intermetallic compounds and the like, particularly Group III–V and Group II–VI compounds. The reactants are placed in a crucible and covered with an encapsulant which is caused to flow through and over the reactants to seal the system prior to the time that a temperature is reached when the vapor pressure of one or more of the reactants becomes appreciable. A temperature gradient may be established along the vertical axis of the crucible during the sealing period. When the system is sealed the overpressure is raised and the temperature is increased to a level at which the reaction is completed. Noncondensables such as nitrogen may also be used as reactants.

This invention relates to the synthesis of intermetallic compounds and the like and particularly to the Group III–V and Group II–VI intermetallic compounds, at least one component of which has a relatively high vapor pressure at elevated temperatures.

Although the term "intermetallic" is used throughout this description for convenience in referring to the products of the method of this invention, it is to be understood that this term as used hereinafter is meant to include compounds formed of metals and noncondensable reactants such as nitrogen and hydrogen as well. Since intermetallic compounds which are formed of one or more metal components having appreciable vapor pressures at elevated temperatures are commonly the most difficult to produce, the description to follow will be in terms of the synthesis of this type of intermetallic compounds. The method of this invention is, however, equally applicable to the synthesis of those intermetallic compounds, the preparation of which does not present the problem of component vapor pressure. It is also within the scope of this invention to apply this method of intermetallic compound synthesis to the forming of ternary and quaternary compounds, to mixed Group III–V compounds as well as to Group II–III–V compounds and the like.

During the past decade there has developed a growing interest in various uses for the Group III–V and Group II–VI intermetallic compounds in quantum electronic applications, e.g., as light-emitting diodes, infrared window elements, Gunn diodes and Hall generators. Exemplary of the Group III–V intermetallics are those formed by reacting one or more of such Group III elements as gallium and indium with one or more of such Group V elements as phosphorous, arsenic and antimonyl. Exemplary of the Group II–VI intermetallics are those formed by reacting one or more of such Group II elements as zinc, cadmium and mercury with one or more of such Group VI elements as sulfur, selenium and tellurium. A number of various dopants may also be added, including lead and tin.

Many of these components have very high vapor pressures at elevated temperatures both in their elemental state and in their combined state, a fact which has made the formation of these intermetallic compounds in their polycrystalline state exceedingly costly. This means that although the principal difficulties of producing single crystals from the polycrystalline materials such as the arsenides, phosphides, tellurides, selenides and the like have been largely overcome by use of liquid-encapsulated crystal growing techniques, the excessive cost of the polycrystalline intermetallics has materially hindered single crystal manufacture and use.

The present, most acceptable method for synthesizing these intermetallic compounds in polycrystalline form for single crystal growing is what may be termed the horizontal Bridgman technique in which the components are combined using vapor/liquid-phase reactions and then horizontally zone-refined to produce an ingot which is subsequently cleaned and etched. In producing at least some of the intermetallic compounds, this prior art method is time consuming and expensive; moreover, the quality of the ingot is difficult to control and it is generally necessary to use an excess of the volatile component.

It would therefore be desirable to have an improved method for synthesizing intermetallic and related compounds which is capable of producing such compounds with controllable quality and at less expense.

It is therefore a primary object of this invention to provide an improved method for synthesizing intermetallic compounds, which contain at least one component which is volatile at elevated temperatures and particularly Group III–V and Group II–VI intermetallics. An additional object is to provide a method which provides for the introduction of non-condensable reactants. It is another object to provide a method of the character described which is less expensive and less time-consuming than the prior art method and which does not require an excess of the volatile component. It is still another object to provide such a method which lends itself to relatively large-batch production of such intermetallic compounds and which may be incorporated directly into a crystal growing procedure without cooling and remelting of the intermetallic compound. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the single accompanying drawing which shows an apparatus suitable for carrying out the method of this invention in a simplified, somewhat diagrammatic form.

Briefly, in the method of this invention, the reaction components are placed in a crucible and covered with an encapsulant. If the encapsulant is a solid at room temperature it is preferably in the form of a disc or flat plate configuration which fits snugly into the crucible and covers the reaction components. The encapsulant may be a liquid at room temperature, in which case it is poured over the reaction components. The encapsulant, in any form, must be made to flow over and seal off the components prior to the time when the vapor pressure of the most volatile of the components becomes appreciable through heating. If the encapsulant is a solid when placed in the crucible and if a highly volatile reaction component is being used, then it is necessary to heat the upper part of the crucible to soften and then melt the encapsulant to cause it to flow down within the interstices between the reaction components to seal the system. Under these conditions, during this first heating period the system is preferably sufficiently pressurized to force the encapsulant to flow more rapidly into the interstices; and a sharp temperature gradient is preferably maintained along the vertical axis of the crucible, decreasing from top to bottom. When the encapsulant has substantially permeated down through the intermetallic components and the system is effectively sealed, the pressure above the system is raised and the final heating of the components begin. The final system pressure in any case is determined by two factors. The first of these is the vapor pressure of the most volatile component at its melting point or at the melting point of the intermetallic compound formed, whichever is higher. The second factor is the reaction rate desired. The final temperature of the material within the crucible is determined by the melting point of the intermetallic compound.

It will be convenient to describe the method of this invention in detail with reference to the simple, somewhat diagrammatic drawing of one embodiment of an apparatus suitable for carrying out the method. In the apparatus shown there is provided a pressure-tight enclosure 10 designed to permit the pressurization of the internal volume 11. This pressure-tight enclosure may conveniently be the pressure- and temperature-controlled crystal-growing furnace described in a copending application Ser. No. 46,096 filed June 15, 1970 in the names of Roger A. Castonquay, Bernard C. Hanley, Frances J. Mallahan and Joseph F. Wenckus and assigned to the same assignee as this application.

Within the enclosure there is positioned a crucible support 12 which rests on a load-bearing rod 13 movable along its vertical axis by any suitable mechanism located external of the enclosure 10. A suitable design for this load-bearing rod and its associated driving mechanism is disclosed in a copending application Ser. No. 653,478 filed July 14, 1967 in the names of Paul R. Doherty and Thomas P. Hosmer for "Apparatus for Imparting Translational and Rotational Motion" and assigned to the same assignee as the application, now U.S. Pat. 3,552,931. It will, however, normally be necessary to impart only translational motion to the rod 13 and support 12. Resting on support 12 is a graphite susceptor 15 into which a crucible 16 is inserted and supported. In keeping with known crystal-growing techniques the crucible 16 may be formed from $SiO_2$, vitreous carbon, pyrolytic graphite, amorphous graphite, boron nitride, pyrolytic boron nitride and the like. It must, of course, be a material which can tolerate the maximum temperature to be attained in the process and which is essentially inert to the encapsulant, the components being reacted and the intermetallic compound formed.

In order to monitor the temperatures within the system and to insure, if necessary, the establishment of a temperature gradient along the vertical axis of the crucible 16, a first thermocouple junction 20 is placed directly under the crucible and a second thermocouple junction 21 is placed at or near the rim of the crucible. The thermocouple wires which form junction 20 extend through a suitable conduit 22 to a pyrometer 23; while the wires which form junction 21 extend through conduit 24 to pyrometer 25. By noting the temperatures registered by pyrometers 23 and 25 it is possible to determine the temperature gradient in the crucible in the position shown in the figure.

Heating of the crucible is performed by coupling the graphite susceptor with an RF coil 30, the leads 31 and 32 of which extend through a seal 33 to an RF power supply not shown. As noted previously, the encapsulant must in effect seal the system prior to the time when the vapor pressure of any one of the components becomes appreciable. When the encapsulant is a solid, it must be melted to flow over the reaction components. In some instances (e.g., in the preparation of GaAs or GaP using an encapsulant such as $B_2O_3$) the heating necessary to soften and melt the encapsulant must be carried out at a temperature level which would cause appreciable vaporization of a component if it were also to be heated to that temperature level. In such cases according to the method of this invention, the unwanted vaporization of the reaction component is prevented, or at least substantially controlled by first heating the crucible in a manner to localize the heating within the top part of the crucible until sealing is accomplished. This is conveniently done by first positioning the graphite susceptor in the position shown in the drawing and then moving it upwardly within the RF coil. Alternatively, the RF coil may be moved downwarly. Since it is also within the scope of this invention to use resistance heating, it is possible to encircle the crucible with a series of resistance coils, each having its own connection to a power supply and to obtain the required heating cycle by controlling the power to the individual coils. Alternatively, a resistance coil may be used in the same manner as the RF coil. The manner of heating required will, of course, determine the position of the crucible relative to the heating means.

A valved-controlled pressurizing gas line 35 and a valve-controlled line 36 to a vacuum pump are provided for pressurizing volume 11 and for pumping out residual toxic vapors and any flushing gases used, respectively.

To begin the synthesis of an intermetallic compound the elemental components are placed in suitable form, such as granules 36 and 37, in the crucible. Any dopants may also be added at this stage. Where gallium is used as one component it is convenient to warm it slightly above its melting point (29.8° C.) and to let it flow down over the other component or components, e.g., arsenic or phosphorous or a mixture of these. Then the encapsulant is placed on top. If the encapsulant is a solid at room temperature, e.g., $B_2O_3$, and if a volatile component is being reacted, then the encapsulant is preferably in the form of a relatively thick plate or disc 38 contoured to make a snug fit with the internal wall of the crucible. Thus in the illustration, it is shown as being of a frustoconical shape to conform to the crucible wall and to be so configured as to make surface-to-surface contact with the internal crucible wall as it rests on top of granules 36 and 37. Normally, a highly pure material will be used as the encapsulant, a fact which minimizes heat transfer by radiation from the crucible wall through the encapsulating material. It is therefore desirable to maximize heat transfer by conduction from the crucible wall through a solid block of encapsulant if the heating time is to be minimized.

The encapsulant must be a material which is inert to the reaction components and to the intermetallic compound formed. Exemplary of the encapsulants which are suitable for this method are boric oxide, barium oxide and these oxides in admixture with barium chloride and sodium fluoride. Although the encapsulant will normally be a material which has a lower density than either the reaction components or reaction product in their molten forms, this is not always necessary, for mechanical means may be used to prevent a molten reactant or molten reaction product from floating up to the surface. Such mechanical means may take the form of screens or other foraminous barriers made of the same material as the crucible or other suitable high-temperature resistant material or of the product intermetallic compound. In the former case the foraminous member will remain intact while in the latter case it will become part of the final product as it melts. In assembling the components in the crucible the mechanical separating means may be placed between the encapsulant and the reaction component or between two reaction components.

During the period that the encapsulant is flowing down through the mass of components and before they are heated sufficiently to react them, the system is pressurized, normally up to several atmospheres to hasten the permeation of the encapsulant and to prevent any vaporization of the volatile component or components. It is possible that during this step the encapsulating agent actually forms a seal around the component particles or aggregates of particles thus further minimizing any vaporization. The system is simultaneously pressurized by pumping in a suitable gas such as nitrogen, argon, helium and the like. The pressure maintained during this encapsulant permeation may be defined as that which is at least equal to the vapor pressure of the most volatile of the intermetallic components at the temperature which this most volatile component experiences during encapsulant penetration. Preferably the overpressure during this step is greater than this minimum pressure by an atmosphere or two. The pressurizing gas may be one which is inert to the intermetallic system, one which is used to control the quality of the atmosphere over the system, or one which in itself is a reactant. Thus argon or helium may be used as an inert pressurizing gas; hydrogen as one gaseous component to create a reducing atmosphere; and hydrogen or nitrogen may be used as a reactant.

After the encapsulant has melted and a portion of it has penetrated throughout the unreacted components the temperature in the entire crucible must be raised to a level at which the reaction between the components is completed. In some instances, this temperature is that which is equal to the melting point of the highest-melting point component reacted. If a temperature gradient had been used during sealing as illustrated in the drawing, this final heating is accomplished by raising the rod and platform so that the entire crucible, and practically the entire length of the graphite susceptor is within the coil. This, of course, serves to eliminate the previously established temperature gradient along the vertical axis of the crucible. In the formation of some intermetallic compounds, complete reaction between the components appears to take only when all of the components have reached the molten state. When this occurs, the reaction may be exothermic and very rapid. It is necessary therefore to provide complete sealing of the reaction system by the encapsulation. This means that the attaining of the reaction temperature must be accompanied by a marked increase in pressure over the system, the final pressure being at least equal to, and preferably considerably greater than, the partial pressure of the most volatile component present in the melt. This in turn means that the actual amount of overpressure depends upon the reaction rate, for the partial pressure of the volatile component decreases as more and more of it reacts. This is due to the fact that its activity goes down once it has reacted to form the intermetallic compound. If it is desired to achieve a rapid reaction rate, then the amount of overpressure must be raised rapidly before or simultaneously with the final heating to reaction temperature. This may be restated by pointing out that the amount of overpressure determines the rate at which the reaction may be permitted to take place with proper containment. For the sake of safety, the overpressure should be considerably greater (e.g., by a factor of 2 or 3) than the highest partial pressure attained by all of the volatile reactants during the synthesis.

Once the reaction has been completed it is necessary to maintain the intermetallic compound in a molten state for a period sufficient to attain homogenization of the product. The determination of a truly homogenized condition is one which must be made experimentally for each different intermetallic compound. It may be desirable to permit the product intermetallic compound to solidify and then remelt it to complete homogenization.

One or more dopants may, of course, be added and their addition may be accomplished by mixing the dopant with the reactants prior to heating or during any part of the heating cycle. If the dopant is to be added during heating this may be done by releasing a pellet or other suitable form of the dopant from over the crucible to penetrate the encapsulant and enter the molten reaction mixture. As noted above, a noncondensable reactant such as hydrogen or nitrogen may be supplied directly from the pressurizing gas. Alternatively, a noncondensable reactant or reactants may be introduced below the liquid encapsulant by way of suitable tubulation extending down through it. If one or more of metal reactants are volatile, then such tubulation must have a suitable aspect ratio and the noncondensable must be supplied under sufficient pressure to prevent the volatile component from escaping from the sealed system.

Once a homogenized polycrystalline intermetallic compound is formed by this method, the heating may be turned off and the material allowed to crystallize. The enclosure is then depressurized and any residual toxic gases flushed out. When the enclosure contains about one atmosphere of harmless gas, it is opened, the material taken out of the crucible and the encapsulant is removed, such as by dissolving off.

Alternatively, the intermetallic compound in its molten state with the encapsulant covering it may be used directly within the same enclosure to grow to a single crystal either by the Czochralski or the Bridgman-Stockbarger technique. Thus if the intermetallic compound were formed within the apparatus described in the above-identified copending application Ser. No. 46,096 the overpressure would be maintained, a rod having a seed attached to the end thereof would be lowered through the encapsulant into the molten intermetallic compound and then be slowly withdrawn while the rod and seed were rotated. Thus a single crystal may be formed by the Czochralski method. If the crucible used is a deep one with a conical bottom the crystal may be formed by the Bridgman-Stockbarger technique by slowly lowering the crucible on the load-bearing rod through a steep temperature gradient while rotating it.

The process of this invention may be further described by the following example which is meant to be illustrative and not limiting. The intermetallic compound produced was gallium arsenide and hence the most difficult conditions were met since arsenic is quite volatile at elevated temperatures. Gallium has a melting point of 29.8° C.; arsenic of 812° C. and gallium arsenide of 1247° C. The vapor pressure of molten arsenic is about 20 atmospheres at its melting point and about 60 atmospheres at the melting point of gallium arsenide. The encapsulant used was $B_2O_3$ which has a melting point of about 450° C.

Stoichiometric quantities of gallium and arsenic to form GaAs were used. The arsenic in the form of nodules of about $1/16$ to $1/8$ inch in size was placed in the crucible and the gallium in lump form placed on it. Slight warming of the gallium caused it to melt and percolate down through the arsenic. The encapsulant, highly pure $B_2O_3$, had been cast as a disc to make a snug fit with the inner wall of the crucible and it was placed on top of the arsenic-gallium mixture.

After the material was placed in the crucible the interior of the furnace (that is, the pressure-tight enclosure) was first pumped down to $10^{-4}$ torr and maintained at this vacuum at 300° C. for 12 hours to degas the charge and the susceptor and to remove any traces of arsenic oxide from the preceding run. Then the temperature of the upper portion of the crucible was brought up to 425° C. while the crucible was maintained in the position relative to the RF coils shown in the drawing. The system was simultaneously pressurized with nitrogen up to 25 p.s.i.g. as the temperature was being raised. This step typically required from 2 to 4 hours and had as its primary purpose the heating of the $B_2O_3$ until it had flowed over and down through the charge.

Then the rod and support were raised so that the entire susceptor was coupled into the RF coil and the crucible was heated evenly along its entire length. As soon as the crucible was raised within the coil, additional nitrogen was admitted to raise the overpressure to 800 p.s.i.g. The $B_2O_3$ encapsulant was completely melted; and it was driven, under pressure, into the voids in the charge. This required between one and two hours. Then the temperature was raised over a period of one hour to 1450° C. while the overpressure was maintained at 800 p.s.i.g. During this part of the synthesis a flash of light from the charge and a sudden rise in the temperature to 760° C. (indicated by the thermocouple 20) were observed. Since the top of the susceptor was visibly hotter than the region adjacent to the location of thermocouple 20, it appeared that the rapid reaction coincided with the melting of the arsenic at 812° C.

Subsequent to the completion of the reaction, the temperature of the crucible was maintained at 1450° C. with a nitrogen overpressure of 800 p.s.i.g. for about one hour, and then the temperature was gradually reduced to 120° C. to freeze the gallium arsenide. Finally, the temperature was raised again to 1450° C. to remelt it. The freezing-melting cycle was performed to insure the homogeneity of the gallium arsenide.

At the end of the run the temperature was gradually reduced to room temperature and the over-pressure to 20 p.s.i.g. Analysis of the reaction product by chemical and metallographic techniques indicated it to have the desired composition of GaAs.

In a similar manner, using overpressures of 1500 p.s.i.g. and temperatures of 450° C. to seal the reactants and of 1470° C. to carry out the reaction, it was possible to form GaP.

Thus the method of this invention provides an improved way of synthesizing intermetallic compounds, at least one component of which is a highly volatile material. It is, of course, applicable to forming intermetallic compounds of more than two elements such as HgCdTe, GaAsP and GaInAs with or without dopants as well as those which contain a noncondensable constituent such as nitrogen.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

We claim:

1. A method for forming an intermetallic compound, at least one component of which exhibits an appreciable vapor pressure at elevated temperatures, comprising the steps of:
    (a) sealing with a liquid encapsulant a reaction system comprising at least two components in the desired stoichiometric ratio to be reacted, said sealing comprising first causing an encapsulant to flow over and around said components prior to the time when the vapor pressure of the most volatile of said components becomes appreciable through heating and then maintaining said components beneath said encapsulant during reaction;
    (b) heating the resulting encapsulated system to a temperature at which the reaction of said components takes place; and
    (c) during steps (a) and (b) maintaining a gaseous overpressure on said system greater than the vapor pressure of said reactants.

2. A method in accordance with claim 1 including the step of introducing at least one solid dopant into said sealed system.

3. A method in accordance with claim 1 wherein said encapsulant is a solid at room temperature.

4. A method in accordance with claim 3 wherein said causing said encapsulant to flow over and around said components is performed while maintaining a temperature gradient through said system, said temperature gradient decreasing from said encapsulant through said reactants.

5. A method in accordance with claim 1 wherein the gas used to maintain said gaseous overpressure is inert to said system.

6. A method in accordance with claim 1 wherein the gas used to maintain said gaseous overpressure contains a gaseous component suitable for controlling the chemical quality of said system.

7. A method for forming an intermetallic compound in which at least one of the components is volatile at elevated temperatures, comprising the step of:
    (a) placing a mixture in the desired stoichiometric ratio of the components of the intermetallic compound to be formed in a crucible;
    (b) covering the component mixture within said crucible with an encapsulant for said intermetallic compound to be formed;
    (c) heating the top of the crucible in a manner to soften and then melt said encapsulant while maintaining a sharp temperature gradient of decreasing temperature from top to bottom of said crucible whereby said encapsulant first flows over and around said components;
    (d) during step (c) maintaining the pressure above said crucible at a level which is greater than the vapor pressure of the most volatile of the intermetallic components at the temperature which said most volatile component experiences during step (c);
    (e) increasing the temperature of said intermetallic components to a temperature sufficient to complete the reaction between said components while maintaining said components beneath said encapsulant;
    (f) simultaneously with step (e) increasing the pressure above said crucible until it is greater than the vapor pressure of said reactants, said increasing being achieved at a rate which is at least sufficient always to maintain said pressure above said crucible greater than the vapor pressure of said reactants as they experience the increasing of temperature of step (e); and
    (g) maintaining the resulting intermetallic compound slightly above its melting point and at the pressure of step (f) until the resulting intermetallic compound is homogenized.

8. A method in accordance with claim 7 wherein said encapsulant used in step (b) to cover said component mixture is in solid form configured to make contact with the inner wall of said crucible.

9. A method in accordance with claim 7 wherein said heating of step (c) comprises bringing the upper portion of said crucible wherein said encapsulant is placed within the lower portion of a heating zone defined by a heating coil.

10. A method in accordance with claim 7 wherein increasing the pressure in step (f) is effected as rapidly as possible to permit the rapid increase of temperature and effect a corresponding rapid reaction rate.

11. A method in accordance with claim 7 including the step of mechanically separating said encapsulant from said components by a foraminous barrier.

12. A method in accordance with claim 7 including the step of mechanically separating at least one of said components from the remainder of said components by a foraminous barrier.

13. A method in accordance with claim 7 including the step of introducing at least one solid dopant into the system subsequent to the completion of step (c).

14. A method in accordance with claim 7 wherein one of said components is arsenic.

15. A method in accordance with claim 7 wherein one of said components is phosphorus.

References Cited

UNITED STATES PATENTS

| 3,366,454 | 1/1968 | Folberth et al. | 23—204 R |
|---|---|---|---|
| 3,496,118 | 2/1970 | Willardson et al. | 23—204 R |
| 3,395,986 | 8/1968 | Gruber | 252—62.3 GA |

OTHER REFERENCES

Mullin et al.: "Liquid Encapsulation Techniques", J. Phys. Chem. Solids, vol. 26 (1965), pp. 782–784.

EARL C. THOMAS, Primary Examiner

H. S. MILLER, Assistant Examiner

U.S. Cl. X.R.

423—561; 252—62.3 GA